United States Patent [19]
Henry

[11] Patent Number: 5,241,784
[45] Date of Patent: Sep. 7, 1993

[54] PLANT ROOT CONTAINER AND METHOD OF AIR ROOT PRUNING

[76] Inventor: Elona I. Henry, 1283 Ranchette Rd., West Palm Beach, Fla. 33415

[21] Appl. No.: 931,484

[22] Filed: Aug. 19, 1992

Related U.S. Application Data

[63] Continuation-in-part of Ser. No. 749,590, Aug. 26, 1991.

[51] Int. Cl.⁵ .............................................. A01G 9/02
[52] U.S. Cl. .............................................. 47/66; 47/73
[58] Field of Search ................................ 47/66, 73, 78

[56] References Cited

U.S. PATENT DOCUMENTS

| | | |
|---|---|---|
| D. 167,009 | 6/1952 | Tersini . |
| 608,590 | 8/1898 | Freund . |
| 3,785,088 | 1/1974 | Guarriello . |
| 4,043,077 | 8/1977 | Stonehocker ................ 47/66 |
| 4,341,040 | 7/1982 | Smith ........................ 47/73 |
| 4,510,712 | 4/1985 | Whitcomb . |
| 4,753,037 | 1/1988 | Whitcomb ................... 47/73 |
| 4,939,865 | 7/1990 | Whitcomb . |
| 5,007,135 | 4/1991 | Rigsby . |
| 5,099,607 | 3/1992 | Lawton . |

FOREIGN PATENT DOCUMENTS

| | | | |
|---|---|---|---|
| 101720 | 10/1963 | Denmark .................... | 47/78 |
| 258404 | 4/1913 | Fed. Rep. of Germany ... | 47/66 |
| 1482977 | 6/1969 | Fed. Rep. of Germany ... | 47/73 |
| 2605076 | 8/1977 | Fed. Rep. of Germany ... | 47/78 |

*Primary Examiner*—Henry E. Raduazo
*Attorney, Agent, or Firm*—Cushman, Darby & Cushman

[57] ABSTRACT

An air root pruning cylindrical container with a corrugated sidewall to lead growth of the root tips along the inner surface of the sidewall to a plurality of apertures in the sidewall. The container will inhibit spiral root growth by air pruning root tips and encourage lateral root growth.

19 Claims, 2 Drawing Sheets

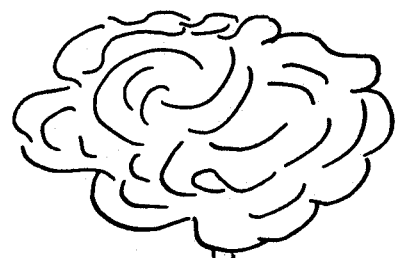
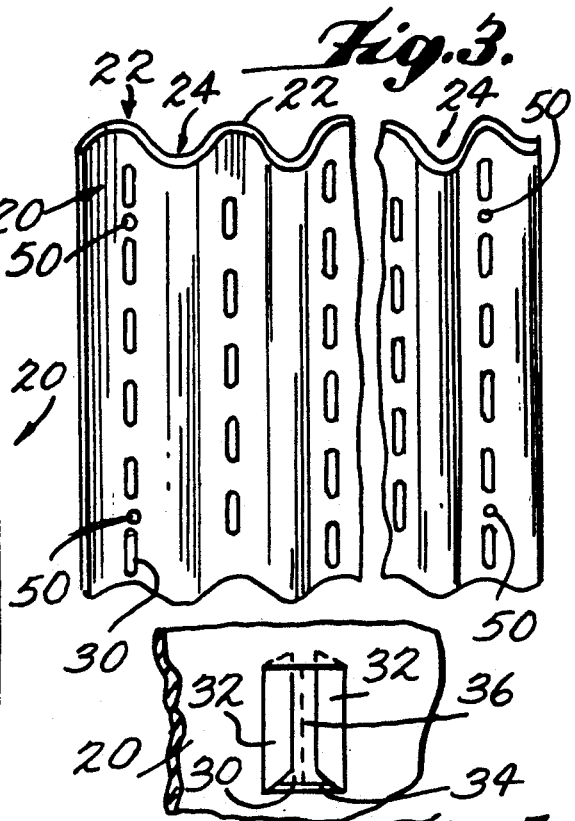
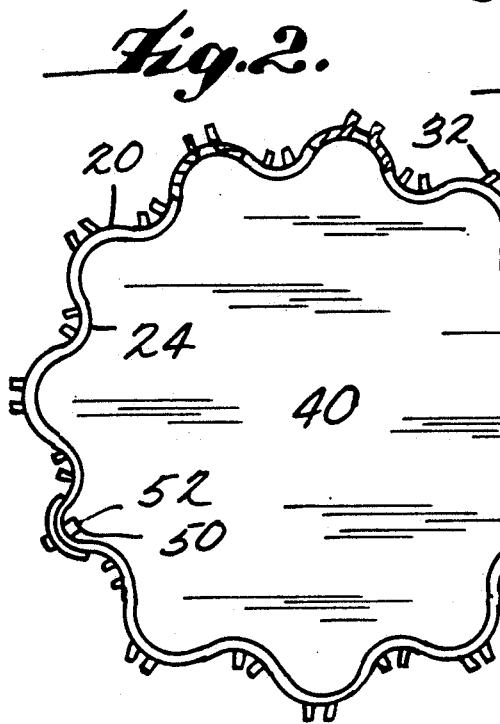
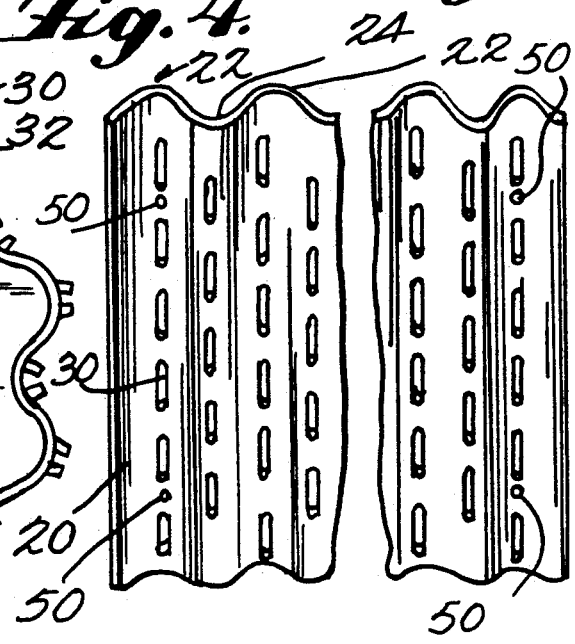

PLANT ROOT CONTAINER AND METHOD OF AIR ROOT PRUNING

CROSS REFERENCE TO RELATED APPLICATION

This is a continuation-in-part of application Ser. No. 07/749,590, filed Aug. 26, 1991.

BACKGROUND OF THE INVENTION

1. Field of the Invention

The present invention relates to a simple and reusable method of planting and containing plants and shrubs that facilitates transplant of said plants and shrubs while minimizing trauma by air pruning the roots.

2. Description of the Prior Art

Plants and shrubs cultivated in anticipation of commercial sale have been grown in some type of containing apparatus for several years. The advantages of this are: the ease in transportability to another location since the entire plant, including the roots, are encased in the container; root damage is minimized when the roots are contained in a specific area rather than being pulled or cut out of the ground; the enhanced growth rate and ease in maintenance with such a procedure.

The most common type of these containers is a simple decomposable burlap bag encircling the root bundle within a mass of soil. This encircling occurs after a period of growth in the ground at which time the plant is removed from the ground. At that time it is easy to damage a large portion of the root structure and traumatize the plant. The plant can survive for an extended period of time in this burlapped stage although it is limited by the decomposition rate of the burlap. Also, roots extending through the bag will be destroyed upon transfer of the plant.

Other types of containers have been used to cultivate seedlings or cuttings in order to minimize the amount of root damage upon transplanting. Metal cans with holes in them have been able to reduce spiral root growth to some extent by air pruning roots that directly grow towards the holes but are difficult to remove from the root ball at the time transplantation is to occur and do not specifically direct root growth towards the hole. An example of this is U.S. Pat. No. 4,497,132 issued Feb. 5, 1985.

Other containers have attempted to increase lateral root growth with crevices located on the interior surface of the container to enable the root tips to grow into the crevices and terminate growth thus resulting in root pruning. Examples of these are U.S. Pat. No. 4,716,680 issued Jan. 5, 1988 and U.S. Pat. No. 4,442,628 issued Apr. 17, 1984. These types of containers, although they do reduce spiral root growth, are expensive to manufacture.

By the present invention, a simple and easily removed container is provided for cultivating plants and shrubs that encourages root growth, minimizes root damage during transplantation by air pruning lateral growth root tips, and reduces spiral root growth.

SUMMARY OF THE INVENTION

It is an object of the present invention to provide an improved container for cultivating seedlings, cuttings, plants, and shrubs within a medium so that the roots of the plant receive a minimal amount of trauma during transplantation. The container comprises a light colored reflective, corrugated, circumferential sidewall extending from a bottom surface which need not form part of the sidewall to a top edge. The corrugated nature of the sidewall is preferably a smoothly undulating surface with no abrupt discontinuities although other corrugated shapes may be employed. The light color of the material aids in the reflective characteristic and reduces heat due to sunlight in the interior of the container. This enhances root growth. The container is formed by the connection of the two vertical edges of the sidewall with a suitable fastener mechanism to form a cylinder. The circumference of the container may be varied by the amount of overlap of the sidewall upon itself at the connection point and the sidewall may taper slightly from the upper top edge inwardly toward the bottom edge to facilitate nesting of several formed containers for storage and transport. The present invention further provides for a plurality of air root pruning means in the form of openings spaced evenly or randomly about or along the sidewall thus reducing the amount of spiral growth and increasing the amount of root branching.

The curvature of the corrugated sidewall which is in an undulated, sinusoidal curve form along its entire length from one vertical edge to the opposite, aids in propagating the growth of the root tip towards a proximate opening in the wall at the time the root tip touches the sidewall. This reduces the amount of spiral root growth and increases the amount of lateral root growth.

Thus, the present invention provides a process for cultivating plants in a growing medium enclosed in a cylindrically shaped corrugated container with a plurality of openings in the sidewall which will effectively air-root prune root growth and prevent spiraling of the root growth.

BRIEF DESCRIPTION OF THE DRAWINGS

FIG. 1 is a partial cut-away perspective view of air root pruning container according to an embodiment of the present invention.

FIG. 2 is a bottom view of the container of FIG. 1.

FIG. 3 is a side elevation view of a sidewall of an alternate embodiment of the present invention.

FIG. 4 is a side elevation view of a sidewall of an alternate embodiment of the present invention.

FIG. 5 is a view of an emodiment of the air root pruning means from the interior of the container.

DETAILED DESCRIPTION OF THE PRESENTLY PREFERRED EXEMPLARY EMBODIMENTS

Figure 6:
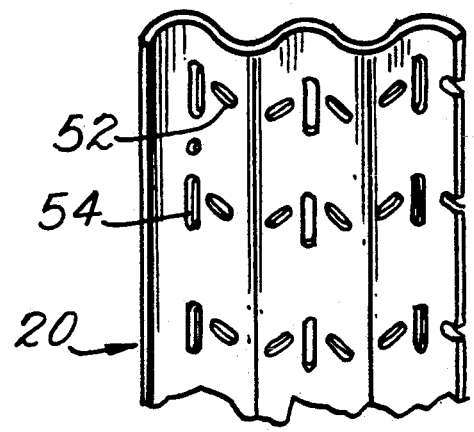
FIG. 6 is an elevational view of a portion of a sidewall of another embodiment.

The plant root container and method of air root pruning of the present invention and how it functions can best be illustrated by referencing the drawings.

FIGS. 1-4 illustrate certain embodiments of the air root pruning container invention designated, in general, by numeral 10. The container 10 is comprised of a circular flat bottom 40 which can be of a plastic sheet material, or a more porous material such as filter cloth, which will allow feeder root penetration in the ground below to form a natural anchor and minimize the need for expensive bracing of the plant above. The corrugated sidewall 20 is formed of a light colored reflective material strong enough to support the weight of the growing medium and the plant when formed in a cylindrical shape. The initial flat shape of the sidewall 20 decreases the shipping and storage costs of the air root pruner. The light color and reflective nature of the material aids in root development by reflecting heat from sunlight and reducing the temperature within the container. This promotes root growth.

The distance from one outer surface apex 22 to the adjacent outer surface apex of the corrugation can vary but is generally between one (1) and four (4) inches. The perpendicular distance between the outer surface convex apex 24 and the concave apex can vary but is generally between one half (0.5) inches and two (2) inches. During root development, lateral root tips will come into contact with the sidewall. The tip will grow along the inner surface due to the corrugation and not be deflected downward causing spiral root growth. The root will grow along the inner concave surface until it reaches the air root pruning means 30 placed at various points along the sidewall.

Although the shape of the aperture as illustrated in FIGS. 1-4 for the air root pruning means is in the form of a vertical slit 30, approximately one (1) inch long, a rectangular slot may be formed by forming two parallel horizontal slits 34 approximately one half (0.5) inch long in the sidewall 20 and bending the flaps thereby created 32 outwardly to create the aperture 30 to enable air root pruning. One embodiment of the present invention, as illustrated in FIG. 3, displaces each air root pruning opening along a vertical line equidistant from each other, said distance can vary but generally is between 3-5 inches apart at each outer surface apex 22 of each corrugation. The air root pruning means displaced on the adjacent apexes are placed to form a checkerboard type pattern. This increases the strength of the sidewall by decreasing the potential for buckling under the weight of the growth medium.

FIG. 4 shows an alternate embodiment with the parallel adjacent air root pruning means displaced from the concave apex 24 thus increasing the number of apertures per square foot of sidewall.

FIG. 2. shows the holes 50 for creating the cylinder from the sidewall 20 by inserting a screw 52 through the holes on the lateral edges of the sidewall. The circumference of the container can be varied by using the apertures created for the air root pruning means 30 that are on the same horizontal axis as one of the screw holes 50. This facilitates transplantation by the ease in removal of the air root pruner from the root ball and minimizes the damage to lateral root growth. The variability of the circumference also enables the nursery owner to allow the roots to expand and grow a larger plant, simply by increasing the circumference of the root pruner and adding growth medium. Additionally, the amount of overlap may be varied so that the side wall of the container tapers inwardly from the top to the bottom. In such a construction, nesting of the assembled containers can be easily effected which reduces the storage and transportation space required.

The advantages of the present invention can best be understood by examining the elementary root growth process of a plant and the effect of transplanting and by referencing the drawings.

Initial tap roots grow downward towards the bottom to stabilize the plant and eventually reach the bottom of the container. This root will grow until it is either physically pruned by becoming entrapped or air pruned if it exits the container. At this stage, lateral root growth along the tap roots initiates and grows perpendicular to the tap root and towards the inner surface of the container sidewall. Upon reaching the sidewall, in a non-corrugated container, the lateral root will grow in a clockwise or counterclockwise direction along the perimeter of the sidewall in a spiral fashion until it reaches the bottom wall where it is either physically pruned by entrapment or air pruned through drainage holes. Thus, all the roots are concentrated downward with a minimal amount of lateral root growth. Upon transplantation, these roots provide little lateral support for the above plant and are at a level below optimal soil condition for growth of the root tip. The concentration of roots at the bottom of the container also restricts the flow of nutrients from a broader area of soil and upon increase in diameter during growth, will increase the amount of pressure upon adjacent roots and reduce the amount of water and nutrients available to the above plant.

The present invention provides an improved container and method for growing and transplanting plants in a commercial nursery type environment where ease of transport, cost and storage of the containers, and quality of plants grown is of utmost importance. While the present invention as described above may be manufactured from fiber glass or even light weight aluminum sheet, in some cases, a light weight plastic such as polypropylene may be employed. With such a material, a sheet of the selected width may be continuously extruded and perforated while being shaped into the sinusoidal form between complementary templets. In another form, the extrusion may be effected with a nozzle of suitable width which will extrude the plastic directly onto a forming surface which will transport the extruded plastic away form the extrusion nozzle. Perforation of the sheet to provide the air pruning holes 30 may be done at a later time with a roller provided with plurality of spaced perforating punches. Other aperture configurations, such as shown in FIG. 6, may also be employed where, in use, the horizontal and vertically oriented slot apertures, 52, 54 are formed in the side wall in an alternating relation. Also, the slots apertures may all be oriented in the same direction either vertically or horizontally. In addition, in the FIG. 6 embodiment, the vertical slot apertures 54 are elongated in length to a greater extent than the horizontal dimension of the second set of horizontal slot apertures 52. Also, as shown in FIG. 6, the lower fastening hole 50a is offset from the adjacent edge to a greater extent than the upper fastening hole 50b to allow a user to slightly taper the sidewall from the top inwardly toward the bottom edge of the sidewall. This will allow nesting of the assembled containers for storage and transportation.

Figure 7A:
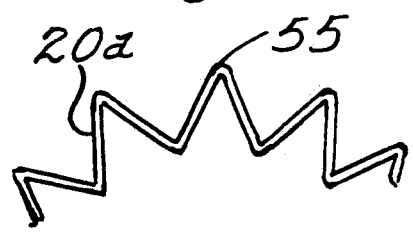
FIGS. 7a and 7b are top views in section of other embodiments of this invention.
Figure 7B:
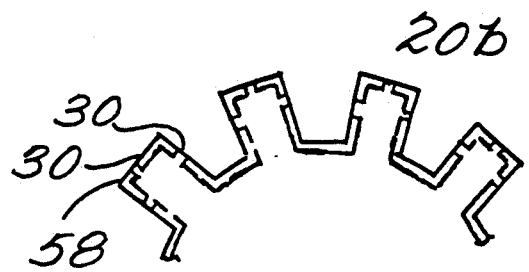

As shown in FIGS. 7a and 7b, two other forms of side wall shapes, 20a and 20b, may be employed in some circumstances. As shown in FIG. 7a, the corrugations have flat side surfaces that intersect to form a sharp edge and are thus pointed instead of smoothly curved as in the previous embodiment of FIGS. 1-4, while in FIG. 7b, the shape of the corrugation is crenelated. In such a configuration the air root pruning apertures 30 may be located in the side walls of the crenelation, at the apexes of the points as at 55 in FIG. 7a or in the end wall at 58 as shown in FIG. 7b. Of course, both arrays of the apertures may also be employed.

Figure 8:
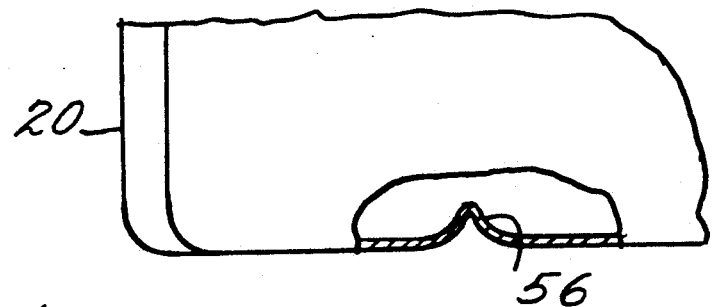
FIG. 8 is a sectional view in elevation of a portion of the bottom wall useful with the foregoing embodiments.

In FIG. 8, there is shown a bottom wall for the containers described above and which is characterized by the provision of a deflecting surface 56 for directing any tap root that engages this surface toward the side wall 20. FIG. 8 also shows the slight taper to the sidewall 20 described above.

Having described the invention, it will be apparent to those skilled in this art that various modifications may be made therein without departing from the spirit and scope of the invention as defined in the appended claims.

What is claimed is:

1. A container for enclosing the roots and root tips of a plant intended to be transplanted and growing medium comprising:

a sidewall formed from a sheet of material having opposite top and lower edges and side edges that extend generally vertically when said container is in use and said sheet of material having a corrugated shape including undulations extending from one side edge to the opposite side edge, said sidewall having an outer and an inner surface, each said undulation including a trough and an apex extending from said top to said lower edge, the inner surface of a said side edge of said sidewall overlapping the outer surface of the opposite side edge to form a cylinder attached by a connecting means for affixing said side edges, the lower edge of said sidewall being the perimeter of the bottom of said container;

a plurality of air root pruning means located in said sidewall for pruning root tips, whereby said container inhibits the tendency of spiral root growth by leading root tips to the said air root pruning means and encouraging additional root branching, said pruning means comprising apertures in said sidewall, said apertures being located at said apexes of the undulations in said sidewall when viewed from the exterior of said container.

2. The container as claimed in claim 1, wherein said apertures are formed from vertical and horizontal slits in said sidewall, said vertical slits defining panels, said panels being displaced outwardly from said sidewall to create an aperture in said sidewall for air root pruning and drainage purposes.

3. The container as claimed in claim 2, wherein said sidewall shape has a plurality of circumferentially spaced convex apexes and troughs and said apertures are vertically equidistant from each other along each convex apex relative to the outer surface of the corrugated sidewall.

4. The container as claimed in claim 2, wherein said apertures are vertically equidistant from each other along each convex apex and trough relative to the outer surface of the corrugated sidewall and formed in alternating horizontal rows forming a checkerboard pattern.

5. The container as claimed in claim 1, wherein said sidewall is comprised of a light reflective material to reduce heat within the container and encourage root development.

6. The container as claimed in claim 1, wherein a bottom wall is provided and comprises filter cloth allowing feeder roots of a plant to penetrate the soil underneath and reduce the need for bracing of the plant and the possibility of tipping.

7. The container as claimed in claim 1, wherein said connecting means comprises holes spaced along each vertical edge of said sidewall for allowing fastening member to pass through and connect said vertical overlapping edges to form said cylindrical shape.

8. The container as claimed in claim 7, whereby said apertures are used as said holes for allowing fastening members to pass through and variably adjust the circumference of the cylindrical shape of the container.

9. The container as claimed in claim 1, wherein said apertures include a plurality of first apertures having a shape comprising, in use, a horizontally elongated slot having a selected length and a plurality of second apertures having a shape comprising, in use, a vertically elongated slot having a selected length.

10. The container as claimed in claim 9 wherein said horizontal length of said first apertures is greater in size than said vertical length of said second apertures.

11. The container as claimed in claim 9 wherein, about a selected circumference of said sidewall, said first apertures are separated from each other by at least two second apertures.

12. The container as claimed in claim 11 wherein said undulations have apexes on the exterior surface of said sidewall and said first apertures are located on the apexes of the exterior surface of said sidewall.

13. A container for enclosing the roots and root tips of a plant intended to be transplanted and growing medium comprising:

a sidewall formed from a sheet of material having opposite top and lower edges and side edges and having a corrugated shape including undulations each from one side edge to the opposite side edge, said sidewall having an outer and an inner surface, each said undulation extending from said top to said lower edge and being crenelated in shape with each having three substantially flat surfaces one of which extends approximately perpendicular to the other two surfaces and which connects the other two surfaces to define an inner or an outer apex, the inner surface of a said side edge of said sidewall overlapping the outer surface of the opposite side edge to form a cylinder attached by a connecting means for affixing said side edges, the lower edge of said sidewall being the perimeter of the bottom of said container;

a plurality of air root pruning means located in said sidewall for pruning root tips, whereby said container inhibits the tendency of spiral root growth by leading root tips to the said air root pruning means and encouraging additional root branching, said pruning means comprising apertures located at the outer apexes of said undulations in said sidewall.

14. The container as claimed in claim 1 wherein said undulations are crenelated in shape with each having three substantially flat surfaces, one of which extends approximately perpendicular to the other two surfaces and which connects the other two surfaces.

15. The container as claimed in 7 wherein at least one of said holes along a vertical edge is spaced from said adjacent vertical edge a greater distance than others of said holes to allow a taper to be provided in assembling said sidewall.

16. The container as claimed in claim 1 wherein said sidewall is made of a plastic material.

17. A container for enclosing the roots and root tips of a plant to be transplanted and growing medium comprising:

a peripheral wall having an upper and a lower edge, said peripheral wall being corrugated in shape and defining, in use, a body for receiving material therein, said corrugated shape including undulations including troughs and apexes each trough and apex extending between said upper and said lower edge about said peripheral wall, said lower edge of said peripheral wall being the perimeter of the bottom of said container;

a plurality of air root pruning means located in said peripheral wall for pruning root tips, whereby said container inhibits the tendency of spiral root growth by leading root tips to the said air root pruning means and encouraging additional root branching, said pruning means comprising apertures in said sidewall, said apertures being located at said apexes of the undulations in said peripheral wall when viewed from the exterior of said container.

18. The invention as claimed in claim 14 wherein said peripheral wall is constructed from sheet material having a pair of side edges joined together to define a substantially cylindrical shape for said container.

19. The invention as claimed in claim 15 wherein said side edges are overlapped and attached by connecting means.

* * * * *